US012643493B2

(12) United States Patent
Chibon et al.

(10) Patent No.: US 12,643,493 B2
(45) Date of Patent: Jun. 2, 2026

(54) APPLICATION PROFILES IN ELECTRONIC CONTROL UNITS (ECU)

(71) Applicant: Red Hat, Inc., Raleigh, NC (US)

(72) Inventors: Pierre-Yves Chibon, Puteaux (FR);
Alexander Larsson, Stockholm (SE);
Leigh Griffin, Waterford (IE); **Ian
Scott McLeod**, Chicago, IL (US)

(73) Assignee: Red Hat, Inc., Raleigh, NC (US)

( * ) Notice: Subject to any disclaimer, the term of this
patent is extended or adjusted under 35
U.S.C. 154(b) by 349 days.

(21) Appl. No.: 18/142,461

(22) Filed: May 2, 2023

(65) Prior Publication Data

US 2024/0367598 A1 Nov. 7, 2024

(51) Int. Cl.
*B60R 16/023* (2006.01)

(52) U.S. Cl.
CPC .................................... *B60R 16/023* (2013.01)

(58) Field of Classification Search
CPC ............................. B60R 16/023; B60R 16/236
See application file for complete search history.

(56) References Cited

U.S. PATENT DOCUMENTS

| | | | |
|---|---|---|---|
| 10,416,985 B2 | 9/2019 | Madrid et al. | |
| 10,436,136 B2 | 10/2019 | Tyler et al. | |
| 10,496,398 B2 * | 12/2019 | Fox ........................... | G06F 8/60 |
| 10,621,796 B2 | 4/2020 | Gintz et al. | |
| 11,029,946 B2 * | 6/2021 | Fox ...................... | G06F 11/0793 |
| 11,119,757 B2 | 9/2021 | Gintz et al. | |
| 12,164,910 B2 * | 12/2024 | Clark ................... | G06F 11/1433 |
| 2013/0245880 A1 * | 9/2013 | Mcquade ............. | G07C 5/0808 |
| | | | 701/32.4 |
| 2017/0278320 A1 * | 9/2017 | Isozaki ................... | H04L 12/66 |
| 2019/0278582 A1 * | 9/2019 | Miyake ..................... | G06F 8/71 |
| 2019/0312892 A1 | 10/2019 | Chung et al. | |

FOREIGN PATENT DOCUMENTS

CA 2950752 C * 8/2022

OTHER PUBLICATIONS

Anonymous. "ECU Engine Control Unit", downloaded from the
Internet on Feb. 17, 2023 (4 pages), located at: https://syrus.
digitalcomtech.com/docs/ecu.
Anonymous. "EZ LYNK AutoAgent Installation Guide", down-
loaded from the Internet on Feb. 17, 2023 (3 pages), located at:
https://support.ppei.com/portal/en/kb/articles/ez-ly.

\* cited by examiner

*Primary Examiner* — Tammara R Peyton
(74) *Attorney, Agent, or Firm* — Womble Bond Dickinson
(US) LLP

(57) ABSTRACT
Receive a first electronics control unit (ECU) profile, the
first ECU profile comprising a first set of services. Switch
execution, on an ECU, by a processing device, to the first
ECU profile from a second ECU profile, the second ECU
profile comprising a second set of services, wherein an
intersection of the first set of services and the second set of
services comprises a third set of services. Start, on the ECU,
a set of services included in the first ECU profile and not
included in the third set of services.

14 Claims, 6 Drawing Sheets

100

HOST SYSTEM 110a

EXECUTION ENVIRONMENT 130

VIRTUAL MACHINE 132a

CONTAINER 136a

VIRTUAL MACHINE 132b

CONTAINER 136b

HOST OS 120

HYPERVISOR 125

PROCESSING DEVICE 160a

MEMORY 170

STORAGE DEVICE 180

DEVICE 190

NETWORK 105

HOST SYSTEM 110b

ELECTRONIC CONTROL UNIT MANAGEMENT SYSTEM 140

PROCESSING DEVICE 160b

ECU PROFILE MANAGEMENT SERVICE 142

CLIENT DEVICE 150

200

300

VEHICLE STATE

302

DRIVING

ASSISTED PARKING

```
MASTER ECU
```

304

```
DRIVING {
ZONE1: PROFILE-1A
ZONE2: PROFILE-2A
}
```

312

```
ASSISTED-PARKING {
ZONE1: PROFILE-1B
ZONE2: PROFILE-2B
ZONE3: PROFILE-3
}
```

318

```
ZONE1 ECU
```

306

```
PROFILE-1A {
SERVICE-1
SERVICE-2
}
```

314

```
PROFILE-1B {
SERVICE-1
SERVICE-5
}
```

320

ZONE

```
ZONE2 ECU
```

308

```
PROFILE-2A {
SERVICE-3
SERVICE-4
}
```

316

```
PROFILE-2B {
SERVICE-3
SERVICE-4
SERVICE-6
}
```

322

```
ZONE3 ECU
```

310

324

```
PROFILE-3 {
SERVICE-7
}
```

FIG. 3

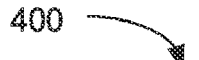

400

RECEIVE A FIRST ELECTRONICS CONTROL UNIT (ECU) PROFILE, THE FIRST ECU PROFILE COMPRISING A FIRST SET OF SERVICES;
410

SWITCH EXECUTION, BY A PROCESSING DEVICE, TO THE FIRST ECU PROFILE FROM A SECOND ECU PROFILE, THE SECOND ECU PROFILE COMPRISING A SECOND SET OF SERVICES, WHEREIN AN INTERSECTION OF THE FIRST SET OF SERVICES AND THE SECOND SET OF SERVICES COMPRISES A THIRD SET OF SERVICES
420

START SERVICES INCLUDED IN THE FIRST ECU PROFILE AND NOT INCLUDED IN THE THIRD SET OF SERVICES
430

FIG. 4

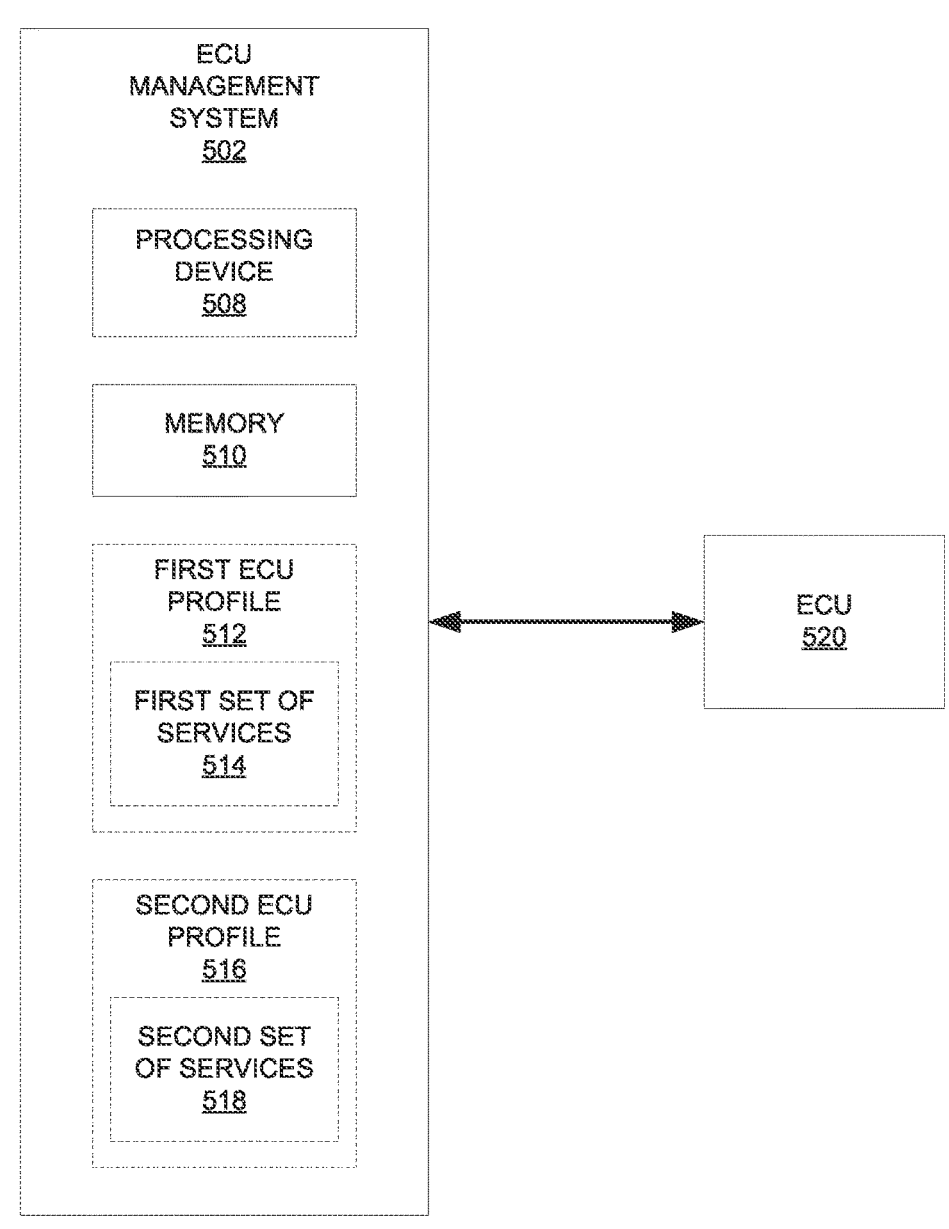
FIG. 5

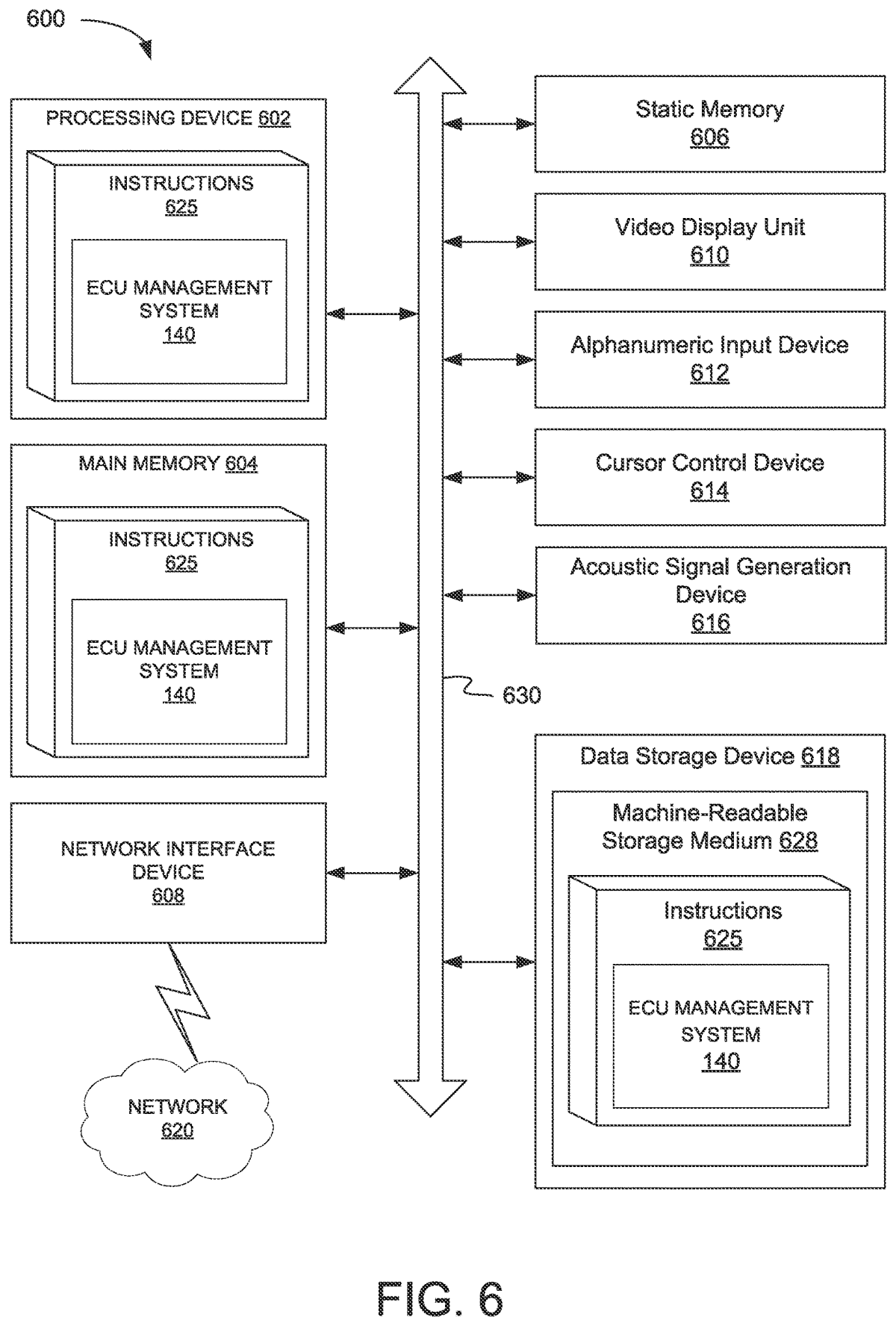

600

PROCESSING DEVICE 602

INSTRUCTIONS
625

ECU MANAGEMENT
SYSTEM
140

MAIN MEMORY 604

INSTRUCTIONS
625

ECU MANAGEMENT
SYSTEM
140

NETWORK INTERFACE
DEVICE
608

NETWORK
620

Static Memory
606

Video Display Unit
610

Alphanumeric Input Device
612

Cursor Control Device
614

Acoustic Signal Generation
Device
616

630

Data Storage Device 618

Machine-Readable
Storage Medium 628

Instructions
625

ECU MANAGEMENT
SYSTEM
140

FIG. 6

APPLICATION PROFILES IN ELECTRONIC CONTROL UNITS (ECU)

TECHNICAL FIELD

Aspects of the present disclosure relate to automotive computing, and more particularly, to managing electronic control modules.

BACKGROUND

Electronic control units, also known as electronic control module, are embedded systems in automotive electronics that control one or more of the electrical systems or subsystems in a car or other motor vehicle. An electronic control unit (ECU) can receive input from one or several parts of the vehicle and use that information to manage vehicle operations. For example, an airbag ECU can receive information from crash sensors and seat sensors. If the vehicle is involved in a crash, the ECU can decide which airbags to deploy depending on where passengers are sitting. The ECU can then direct actuators to deploy them. The actuators can convert electrical signals into the physical value needed, using valves, injectors, or relays.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments without departing from the spirit and scope of the described embodiments.

FIG. 3 is a flow diagram of an ECU management architecture, in accordance with some embodiments.

FIG. 4 is a flow diagram of a method of managing or controlling an ECU, in accordance with some embodiments.

FIG. 5 is a component diagram depicting an example ECU management architecture, in accordance with embodiments of the disclosure.

FIG. 6 is a block diagram of an example computing device that may perform one or more of the operations described herein, in accordance with some embodiments of the present disclosure.

DETAILED DESCRIPTION

Figure 1:
FIG. 1 is a block diagram that illustrates an example electronic control unit (ECU) management architecture, in accordance with some embodiments.

An electronic control unit (ECU), also known as an electronic control module (ECM), is an embedded system in automotive electronics that controls one or more of the electrical systems or subsystems in a car or other motor vehicle. Modern vehicles can have many ECUs, and these can include some or all of the following engine control module (ECM), powertrain control module (PCM), transmission control module (TCM), brake control module (BCM or EBCM), central control module (CCM), central timing module (CTM), general electronic module (GEM), body control module (BCM), and suspension control module (SCM). Sometimes an assembly incorporates several individual control modules (a PCM, for example, may control both the engine and the transmission).

Modern motor vehicles may have hundreds of ECUs. As the embedded software used in ECUs continues to increase in volume of code, complexity, and sophistication, managing the complexity and quantity of ECUs in a vehicle has become a key challenge for original equipment manufacturers (OEMs).

An ECU can be a digital computer that can read signals coming from sensors placed at various parts and in different components of the car and depending on this information can control various important units, e.g., engine and automated operations within the car, and can monitor the performance of components used in the car.

An ECU can comprise hardware and software. In some embodiments, the software may be firmware. The hardware can include various electronic components on a printed circuit board. One component can be a microcontroller chip along with an electrically programmable read-only memory (EPROM) or a flash memory chip. The software can execute on the microcontroller. ECU characteristics can include, many analog and digital I/O lines, both low- and high-power device interface/control, multiple communication protocols, e.g., CAN (Controller Area Network) and KWP-2000 (Key Word Protocol), large switching matrices for both low- and high-power signals, intelligent communication interface adapters, automatic fixture recognition and software sequence enablement, and power device simulation.

There are many types of ECUs. For example, an Engine Control Module (ECM) can monitor and control various functions of an internal combustion engine, e.g., fuel injection, ignition timing, and idle speed control system. All of these functions may rely on data, e.g., engine coolant temperature, air flow, and crank position, that can be received from various sensors. An ECM may also store the values of sensors and actuators in battery-backed memory as the vehicle is driven over time, so that these "tuning" attributes don't need to be determined from scratch each time the vehicle is driven.

A Powertrain Control Module, or PCM, is an ECU that can monitor and control such features as speed control, air conditioning, battery charging, and shifting of an automatic transmission. The inputs provided to a PCM may include a throttle position sensor, output shaft speed sensor, vehicle speed sensor, engine RPM sensor, brakes, cruise control, and ignition. Speed governors may also make use of the PCM A Vehicle Control Module, or VCM, may control such functions as electronic power steering, adaptive cruise control, airbags, and electronic stability control systems. A VCM can take inputs from crash sensors (accelerometers), in addition to sensors that detect occupant weight, seating position, seat belt use, and seat position to determine the force with which, in the event of an accident, the air bags should deploy. A VCM may also take inputs from steering wheel angle sensors, wheel speed sensors, yaw rate sensors, and lateral acceleration sensors to provide an optimum driving experience.

Additionally, automakers face rising customer demand for seamless connectivity solutions and energy management capabilities, as well as more autonomous features ranging from partially autonomous features such as lane departure warning, traffic jam piloting, and autonomous parking, to fully autonomous features, e.g., intersection autonomy. They are also facing increasing regulations for car software and electrical/electronic architectures, such as safety standards, $CO_2$ emissions objectives, data management and protection of personal data (not to mention risks of liability for accidents caused by these autonomous vehicle features), and mandatory cybersecurity upgrades. As a result, software in modern cars can contain millions of lines of code. This will grow with the increased capacity of electronic control units and the number of sensors, ranging from multiple cameras to advanced technology, like LiDAR (light detection and ranging).

In fact, modern vehicles can be considered to be small edge/mesh networks, in which each ECU may be responsible for a single or a few tasks. The increasing user/operator expectations for ease/frequency of update and improved usability throughout the ECU (and vehicle) lifecycle is creating new requirements for the automotive industry. One approach to address these issues is to reduce the number of small ECUs and consolidate their capabilities into a smaller number of more complex ECUs whose responsibilities and configurations can evolve based on customer requirements. However, in order to allow an ECU to assume multiple responsibilities, an ECU may need to run multiple applications, which can be a challenge for purpose-built ECUs. Historically, a manufacturer, when starting up the vehicle, might load all the applications that an ECU might need. This approach, however, does not scale well. It can be difficult to perform in-field upgrades of ECUs in order to increase their computational power. Selecting particular applications on an as-needed basis can extend the operational life of ECU hardware.

Furthermore, a modern vehicle may be able to exist within a variety of "vehicle states," e.g., entering assisted driving, exiting assisted driving, assisted parking, highway mode, for which different vehicle resources may be desired (or not.) For example, while in a state of "assisted driving," the driver may not wish to expend resources on the vehicle's back-up camera. It can be advantageous to change the active set of services in response to the vehicle state. In some embodiments, an ECU may need to run a different application or sets of applications depending on vehicle state In some embodiments, switching between these sets of services may result from a change of vehicle state, rather than by any other action by a vehicle operator.

Additionally, and as an example, it may be desirable for an electric vehicle to disable or switch-off particular portions of the vehicle, controlled by various ECUs, so as to conserve battery power. In some embodiments, a decision to switch profiles could be driven by rules, e.g., time of day, load on the ECU, ECUs, or aggregate vehicle, current needs of the operator or vehicle. In some embodiments, a decision to switch profiles could be driven by environmental considerations, e.g., weather, traffic conditions, remaining battery charge. Other stimuli requiring a change in ECU profile deployment strategy are contemplated.

A solution to this challenge is to provide each ECU with a number of profiles that can be switched between as circumstances and user/operator desires dictate. Each profile can include a set of services and other related applications, as well as auxiliary supports such as data and other relevant artifacts, e.g., authorization/authentication keys, certificates, etc.

Although aspects of the disclosure may be described in the context of an ECU management architecture, embodiments of the disclosure may be applied to any computing system that configures and manages ECUs. If a service is part of two profiles, switching from one profile to another should not impact the state of this running service, with a supervising mechanism able to identify overlap so as to avoid stopping and restarting running services. However, any services in the "old" profile that are not part of the "new"

profile should be turned off (reducing processor and memory load). New services identified in the "new" profile should be enabled.

In some embodiments, a set of ECUs may comprise a "zone," and a particular zone may have an ECU controller. In some cases, a vehicle may comprise multiple zones, each with their own ECU controller, which are in turn managed by a master ECU controller. In some embodiments, a zone may have multiple, redundant ECU controllers. In some embodiments, a vehicle may have multiple master ECU controllers.

In some embodiments, profiles can be defined by the "administrator" of the system, e.g., the vehicle manufacturer. In some cases, profiles may be defined by the operator of the vehicle. In some embodiments, at an operating system level, profiles may be managed at a user level, through a custom command-line interpreter tool Examples of such a tool can include, in a Linux environment, a "bash" shell script or an Ansible playbook. At an operating system level, in some embodiments, different profiles can be built into the system and switched between directly, e.g., by expanding (in Linux or Unix) the init subsystem.

Init and systemd are both system and service managers associated with Linux systems. They can be responsible for booting the machine once the kernel is loaded, and their tasks can range from mounting the original file system, identifying the "runlevel" (init) or "target" (systemd), loading the operating system, activating the services associated with that runlevel or target and finally displaying the login screen. Init is a service manager associated with earlier Linux distros. Init, in systems that support it, which can be the first process after booting, acts as the parent of all other operating system processes and persists until operating system shutdown. It can be assigned a process ID, or PID, of 1. Init can be a daemon process, a process that does not have a controlling terminal. After the operating system is booted and a file system mounted, a runlevel can be identified.

Typically, there are seven runlevels associated with init: "0" shutdown or halt; "1" single user mode (a root user mode used for troubleshooting); "2" multiuser without network service; "3" multiuser with network service; "4" undefined; "5" graphical mode; and "6" reboot. Once the runlevel is identified the services corresponding to that runlevel can be activated. Init operates on a serial booting principle, so even if a main service fails, init will attempt to launch (usually unsuccessfully) its sub-services.

Systemd is a more recent service manager available in Linux distributions. It can achieve similar results as init but uses a different method to achieve those results. Systemd employs a parallel booting concept in which processes and services can be started in parallel, which can speed up the booting process. Rather than a concept of runlevels, systemd employs target unit files, which are configuration files that define each and every service.

Neither init nor systemd, however, honors existing processes started by other runlevels or targets. For example, if a process (or service) is already running, changing init or systemd levels can result in a "respawn" or restart of the service. Rephrased, neither init runlevels nor systemd targets are aware of the contents of other runlevels or targets. A mechanism is needed to ensure that a running service, that is a member of two profiles, is not affected by switching between profiles, with a supervising mechanism able to identify overlap so as to avoid stopping and restarting running services. However, any services in the "old" profile that are not part of the "new" profile should be turned off (reducing processor and memory load). New services identified in the "new" profile should be enabled and/or started.

FIG. 1 is a block diagram that illustrates an example ECU management architecture 100, in accordance with some embodiments. However, other ECU management architectures are possible, and the implementation of a computer system utilizing examples of the disclosure are not necessarily limited to the specific architecture depicted by FIG. 1.

As shown in FIG. 1 ECU management architecture 100 includes host systems 110a and 110b, ECU management system 140, and client device 150. The host systems 110a and 110b, ECU management system 140, and client device 150 may each include hardware such as processing devices 160a and 160b, memory 170, which may include volatile memory devices, e.g., random access memory (RAM), non-volatile memory devices, e.g., flash memory, and/or other types of memory devices, a storage device 180, e.g., one or more magnetic hard disk drives, a Peripheral Component Interconnect (PCI) solid state drive, a Redundant Array of Independent Disks (RAID) system, or a network attached storage (NAS) array, and one or more devices 190, e.g., a Peripheral Component Interconnect (PCI) device, a network interface controller (NIC), a video card, or an I/O device. In certain implementations, memory 170 may be non-uniform access (NUMA), such that memory access time depends on the memory location relative to processing devices 160a and 160b. It should be noted that although, for simplicity, a single processing device 160a or 160b, storage device 180, and device 190 are depicted in FIG. 1, other embodiments of host systems 110a and 110b, ECU management system 140, and client device 150 may include multiple processing devices, storage devices, or devices. Processing devices 160a and 160b may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing devices 160a and 160b may also include one or more special-purpose processing devices such as an application specific integrated circuit (ASIC), a field programmable gate array (FPGA), a digital signal processor (DSP), network processor, or the like.

Each of the host systems 110a and 110b, ECU management system 140, and client device 150 may be a server, a mainframe, a workstation, a personal computer (PC), a mobile phone, a palm-sized computing device, etc. In some embodiments, host systems 110a and 110b, ECU management system 140, and/or client device 150 may be separate computing devices. In some embodiments, host systems 110a and 110b, ECU management system 140, and/or client device 150 may be implemented by a single computing device. For clarity, some components of ECU management system 140, host system 110b, and client device 150 are not shown. In some embodiments, ECU management system 140 may include a virtual machine-orchestration system. Furthermore, although on-the-fly confidential virtual machine architecture 100 is illustrated as having two host systems, embodiments of the disclosure may utilize any number of host systems.

Host systems 110a and 110b, and ECU management system 140, may additionally include an execution environment 130, which may include one or more virtual machines (VMs) 132a, containers 136a, containers 136b residing within virtual machines 132b, and a host operating system (OS) 120. VM 132a and VM 132b are software implementations of machines that execute programs as though they were actual physical machines. Containers 136 act as isolated execution environments for different workloads of services, as previously described. Host OS 120 manages the hardware resources of the host system 110a and provides functions such as inter-process communication, scheduling, memory management, and so forth.

Host OS 120 may include a hypervisor 125, which may also be known as a virtual machine monitor (VMM), can provide a virtual operating platform for VMs 132a and 132b and manages their execution. Hypervisor 125 may manage system resources, including access to physical processing devices, e.g., processors or CPUs, physical memory, e.g., RAM, storage devices, e.g., HDDs or SSDs, and/or other devices, e.g., sound cards or video cards. The hypervisor 125, though typically implemented in software, may emulate and export a bare machine interface to higher level software in the form of virtual processors and guest memory. Higher level software may comprise a standard or real-time OS, may be a highly stripped-down operating environment with limited operating system functionality, and/or may not include traditional OS facilities, etc. Hypervisor 125 may present other software, i.e., "guest" software, the abstraction of one or more VMs that provide the same or different abstractions to various guest software, e.g., a guest operating system or guest applications. It should be noted that in some alternative implementations, hypervisor 125 may be external to host OS 120, rather than embedded within host OS 120, or may replace host OS 120.

The host systems 110a and 110b, ECU management system 140, and client device 150 are coupled to each other, e.g., may be operatively coupled, communicatively coupled, or may communicate data/messages with each other, via network 105. Network 105 may be a public network, e.g., the internet, a private network, e.g., a local area network (LAN) or a wide area network (WAN), or a combination thereof. In one embodiment, network 105 may include a wired or a wireless infrastructure, which may be provided by one or more wireless communications systems, such as a WiFi™ hotspot connected with the network 105 and/or a wireless carrier system that can be implemented using various data processing equipment, communication towers, e.g., cell towers. The network 105 may carry communications, e.g., data, message, packets, or frames, between the various components of host systems 110a and 110b, ECU management system 140, and/or client device 150.

In some embodiments, processing device 160b may execute ECU profile management service 142. ECU profile management service 142 may receive a request from client device 150 to deploy an ECU profile to an ECU. In some embodiments, ECU profile management service 142 may cause an ECU profile, resident on an ECU, to be replaced with a different ECU profile. ECU profile management service 142 may identify one or more profiles that can be provided to one or more ECUs. Further details regarding ECU profile management service 142 will be discussed at FIGS. 2-5 below.

Figure 2:
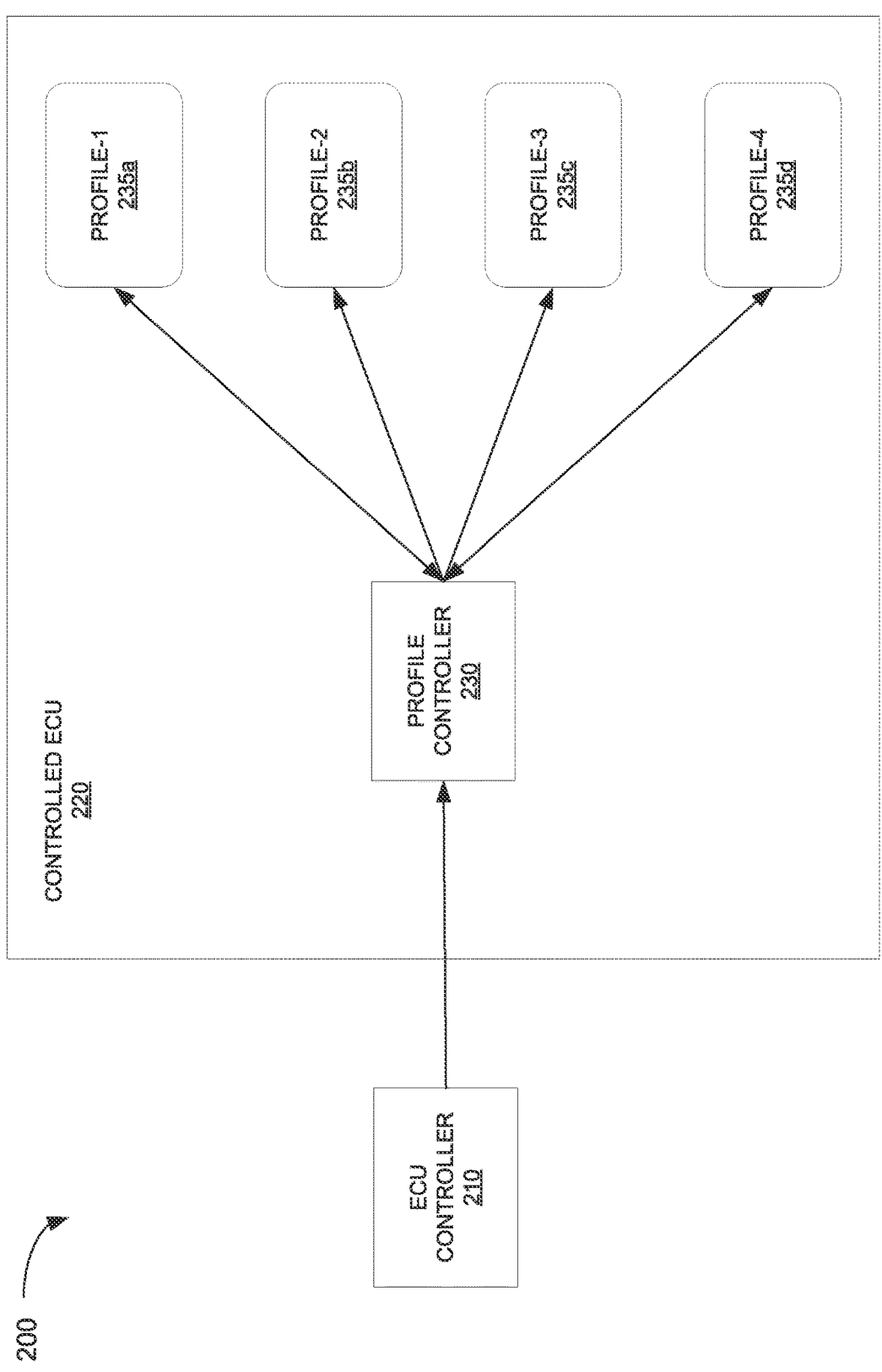
FIG. 2 is a block diagram of an ECU management architecture, in accordance with some embodiments.

FIG. 2 is a block diagram 200 of an ECU management architecture, in accordance with some embodiments. FIG. 2 includes an ECU controller 210, a controlled ECU 220, and a set of ECU profiles 235a-235d. In some embodiments, ECU controller 210 and controlled ECU may correspond to execution environment 130 of FIG. 1. In some embodiments, profile controller 230 may correspond to ECU profile management service 142 of FIG. 1.

Referring to FIG. 2, ECU controller 210 obtains environment data or instructions and directs profile controller 230 to load an ECU profile, e.g., profile-1 235a, for controlled ECU 220. In some embodiments, ECU controller 210 may receive environment data from sensors. In some embodiments, ECU controller 210 may receive instructions from a client device.

In some embodiments, upon an instruction to deploy a particular profile, profile controller 230 first checks to see that the request includes a different profile. In some embodiments, if the requested profile is identical to the currently executing profile, the deployment request simply exits.

In some embodiments, upon a determination that deployment of a different profile is being requested, profile controller 230 compares the set of services currently running, associated with the current profile, with the set of services in the requested profile. In an embodiment, controlled ECU may be running profile-1 235*a* and receive a request to deploy profile-2 235*b*. In an embodiment, profile controller 230 determines that profile-1 235*a* comprises three services, ServiceA, ServiceB, and ServiceC, and profile-2 235*b* comprises four services, ServiceA, ServiceD, ServiceE, and ServiceF.

In an embodiment, profile controller 230 compares the respective sets of services associated with the running profile and the new profile and determines that ServiceA is included in both the current and new profile, ServiceB and Service C are only included in the current profile, and ServiceD, ServiceE, and ServiceF are only included in the new profile. In an embodiment, profile controller 230, as part of the deployment of profile-2 235*b*, starts ServiceD, ServiceE, and ServiceF. In an embodiment, profile controller 230, as part of the deployment of profile-2 235*b*, stops ServiceB and ServiceC. In an embodiment, ServiceA continues to execute without any interruption or change.

In an embodiment, services that are not part of the new profile are stopped prior to starting those services that are only included in the new profile. In some embodiments, stopped services are completely removed from memory and any open files are closed.

In some embodiments, additional init levels (or systemd targets) can be defined, each corresponding to a particular profile. In an embodiment, profiles can be switched by executing an appropriate "systemctl" command. Definition files could specify for which init levels a service is available and/or systemd could start and stop corresponding services when switching between levels.

FIG. 3 is a flow diagram of an ECU management architecture, in accordance with some embodiments. FIG. 3 represents an embodiment in which the vehicle state 302 transitions from a state of Driving to one of Assisted Parking. In an embodiment, the transitioning vehicle comprises three zones, each zone having an ECU and the zone ECUs controlled in turn by a master ECU. In an embodiment, Zone1 is controlled by Zone1 ECU 306, Zone 2 is controlled by Zone2 ECU 308, and Zone 3 is controlled by Zone3 ECU 310. In the embodiment, Zone1 ECU 306, Zone2 ECU 308, and Zone3 ECU 310 are controlled by a master ECU 304.

In an embodiment, while in a state of Driving, processing logic causes the Master ECU 304 to load a profile 312 labeled "DRIVING." In some embodiments, the processing logic may reside in a profile controller similar to profile controller 230 of FIG. 2. In the embodiment, profile 312 contains directives for the Zone1 ECU 306 and Zone2 ECU 308, labeled "PROFILE-1A" and "PROFILE-2A" respectively. Upon entering a vehicle state of "DRIVING," Master ECU 304 will direct Zone1 ECU 306 to load profile "PRO-FILE-A" 314. As a result of loading profile "PROFILE-1A" 314, processing logic will cause Zone1 ECU 306 to start services SERVICE-1 and SERVICE-2.

In an embodiment, while in a state of Driving, Master ECU 304 will also direct Zone2 ECU 308 to load profile "PROFILE-2A" 316. As a result of loading profile "PRO-FILE-2A" 316, processing logic will cause Zone2 ECU 308 to start services SERVICE-3 and SERVICE-4. In some embodiments, the processing logic can reside within a profile controller such as profile controller 230 of FIG. 2.

In an embodiment, upon direction by the vehicle operator to perform an assisted parking operation, the vehicle state will transition to Assisted Parking and the Master ECU 304 will load the profile 318 labeled "ASSISTED-PARKING." Profile 318 contains directives labeled "PROFILE-1B," "PROFILE-2B," and "PROFILE-3" for three zone ECUs: Zone1 ECU 306, Zone2 ECU 308, and Zone3 ECU 310, respectively. FIG. 3 indicates a transition from a vehicle state of Driving to a vehicle state of Assisted Parking by the middle and righthand swim lanes entitled "DRIVING," and "ASSISTED PARKING."

As a result of the new profile 318, processing logic will cause Zone1 ECU 306 to load profile "PROFILE-1B" 320, which includes directives for services "SERVICE-1" and "SERVICE-5." In some embodiments, the processing logic can reside within a profile controller such as profile controller 230 of FIG. 2. As the processing logic determines that service "SERVICE-1" is already running on Zone1 ECU 306, it will continue processing "SERVICE-1." However, as "SERVICE-5" is not running, processing logic will start "SERVICE-5." In an embodiment, an executing service that is listed in both a current profile and a new profile will not be interrupted by a restart during a vehicle state transition. Rather, in some embodiments, the service will continue to execute, unaffected by the vehicle state transition.

In an embodiment, a profile may include references to other artifacts that should be used when starting a particular service. These artifacts can include authorization keys and certificates. In some embodiments, these artifacts may persist across profile loads. In some embodiments, artifacts may be removed when a profile transitions from in-use to out-of-use. In some embodiments, different services, in different profiles, can use different artifacts, e.g., keys and certificates. For example, different services may rely on different authentication mechanisms and consequently rely on different authentication keys and certificates.

In an embodiment, processing logic will further determine that "SERVICE-2," which had been previously started by Zone1 ECU 306 "PROFILE-1A," while in the vehicle state of Driving, is not an element of "PROFILE-1B" 320. As a result, Zone1 ECU 306 will terminate "SERVICE-2." In some embodiments, terminating a service can include closing files associated with that terminated service. In some embodiments, other objects associated with a terminated service may be updated, e.g., vehicle maintenance logs.

As a result of the new profile 318, processing logic will also cause Zone2 ECU 308 to load profile "PROFILE-2B" 322, which includes directives for services "SERVICE-1" and "SERVICE-5." As the processing logic will determine that services "SERVICE-3" and "SERVICE-4" are already running on Zone2 ECU 308, it will continue processing "SERVICE-3" and "SERVICE 4" and start "SERVICE-6." In an embodiment, a profile may include references to other artifacts that should be used when starting a particular service. In an embodiment, an executing service that is listed in both a current profile and a new profile will not be interrupted by a restart during a vehicle state transition. Rather, in some embodiments, the service will continue to execute, unaffected by the vehicle state transition.

In an embodiment, processing logic will further determine that no services previously started by Zone2 ECU "PROFILE-2A" 316, while in the vehicle state of Driving, are not also elements of "PROFILE-2B" 322. As a result, Zone2 ECU 308 will not terminate any services.

FIG. 3 also indicates that in a transition from a vehicle state of Driving to a vehicle state of Assisted Parking, processing logic associated with the Master ECU 304 will direct Zone3 ECU 310 to load profile "PROFILE-3" 324. In an embodiment, profile "PROFILE-3" includes a single service, "SERVICE-7." In an embodiment, processing logic will start Zone3 ECU 310, if necessary, and start "SERVICE-7." In an embodiment, Zone3 could represent a collection of cameras on a vehicle, and "SERVICE-7" could represent the services supporting a back-up camera. In an embodiment, disabling a backup camera during normal driving could be desirable to avoid distracting the driver as well as reducing resource consumption by the vehicle.

FIG. 4 is a flow diagram of a method 400 of managing or controlling an ECU, in accordance with some embodiments. Method 400 may be performed by processing logic that may comprise hardware, e.g., circuitry, dedicated logic, programmable logic, a processor, a processing device, a central processing unit (CPU), a system-on-a-chip (SoC), software, e.g., instructions running/executing on a processing device, firmware, e.g., microcode, or a combination thereof. In some embodiments, at least a portion of method 400 may be performed by ECU management system 140 of FIG. 1.

With reference to FIG. 4, method 400 illustrates example functions used by various embodiments. Although specific function blocks ("blocks") are disclosed in method 400, such blocks are examples. That is, some embodiments are well suited to performing various other blocks or variations of the blocks recited in method 400. It is appreciated that the blocks in method 400 may be performed in an order different than presented, and that not all of the blocks in method 400 may be performed.

Method 400 begins at block 410, where the processing logic receives a first electronics control unit (ECU) profile, the first ECU profile comprising a first set of services. In some embodiments, the first ECU profile corresponds to PROFILE-1 235a of FIG. 2. In some embodiments, environmental changes or vehicle operating condition changes can cause the processing logic to obtain the first ECU profile. In some embodiments, the first ECU profile is obtained by a profile controller corresponding to profile controller 230 of FIG. 2. In some environments, instructions to the profile controller may be provided by an ECU controller similar to ECU controller 210 of FIG. 2. In some embodiments, the ECU controller 210 of FIG. 2 may correspond to the ECU profile management service 142 of FIG. 1.

At block 420, the processing logic switches execution, by a processing device, to the first ECU profile from a second ECU profile, the second ECU profile comprising a second set of services, wherein an intersection of the first set of services and the second set of services comprises a third set of services. In some embodiments, the second ECU profile corresponds to PROFILE-2 235b of FIG. 2. In some embodiments, the intersection of the first set of services and the second set of services is an empty set. In some embodiments, the first set of services and the second set of services are identical. In some embodiments, the first set of services is a proper subset of the second set of services. In some embodiments, the second set of services is a proper subset of the first set of services.

At block 430, the processing logic starts services included in the first ECU profile and not included in the third set of services. In some embodiments, this corresponds to an embodiment in which the second set of services is a proper subset of the first set of services. In some embodiments, the services include those services included in the first profile and not included in the second profile.

FIG. 5 is a component diagram depicting an example ECU management architecture 500, in accordance with embodiments of the disclosure. The ECU management architecture 500 includes ECU management system 502, processing device 508, memory 510, first ECU profile 512, first set of services 514, second ECU profile 516, second set of services 518, and ECU 520. ECU management system 502 may correspond to host system 110a of FIG. 1. ECU management system 502 may include an execution environment that may correspond to execution environment 104a of FIG. 1. An execution environment included in ECU management system 502 may include VMs, containers, or one or more containers within a VM. ECU management system 502 may include any number of execution environments. ECU management system 520 may correspond to ECU management system 140 of FIG. 1. In some embodiments, processing device 508 may correspond to 160a of FIG. 1. In some embodiments, memory 510 may include volatile memory devices, e.g., random access memory (RAM), non-volatile memory devices, e.g., flash memory, and/or other types of memory devices.

ECU management system 502 may cause processing device 508 and memory 510 to submit instructions to ECU 520 to deploy first ECU profile 512 comprising first set of services 514. At the time of deployment, ECU 520 may be executing second ECU profile 516 comprising second set of services 518. In some embodiments, first ECU profile 512 corresponds to PROFILE-1 235a of FIG. 2. In some embodiments, second ECU profile 516 corresponds to PROFILE-2 235b of FIG. 2. In some embodiments, environmental changes or vehicle operating condition changes can cause the processing logic to obtain first ECU profile 512. In some embodiments, first ECU profile 512 is obtained by a profile controller corresponding to profile controller 230 of FIG. 2. In some environments, instructions to the profile controller may be provided by an ECU controller similar to ECU controller 210 of FIG. 2. In some embodiments, ECU controller 210 of FIG. 2 may correspond to the ECU profile management service 142 of FIG. 1. It should be noted that first EC profile 512, first set of services 514, second EC 516, and second set of services 518 are shown for illustrative purposes only and are not physical components of ECU management system 502.

FIG. 6 is a block diagram of an example computing device 600 that may perform one or more of the operations described herein, in accordance with some embodiments. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, a switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device 602, e.g., a general-purpose processor or a programmable logic device (PLD), a main memory 604, e.g., a synchronous dynamic random-access memory (DRAM) or a read-only memory (ROM), a static memory 606, e.g., flash memory, and a data storage device 618, which may communicate with each other via a bus 630.

Processing device 602 may be provided by one or more general-purpose processing devices such as a microprocessor, central processing unit, or the like. In an illustrative example, processing device 602 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also include one or more special-purpose processing devices such as an application specific integrated circuit (ASIC), a field programmable gate array (FPGA), a digital signal processor (DSP), a network processor, or the like. The processing device 602 may be configured to execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610, e.g., a liquid crystal display (LCD) or a cathode ray tube (CRT), an alphanumeric input device 612, e.g., a keyboard, a cursor control device 614, e.g., a mouse, and an acoustic signal generation device 616, e.g., a speaker. In one embodiment, video display unit 610, alphanumeric input device 612, and cursor control device 614 may be combined into a single component or device, e.g., an LCD touch screen.

Data storage device 618 may include a computer-readable storage medium 628 on which may be stored one or more sets of instructions 625 that may include instructions for an ECU management system 140, further including an ECU profile management service (not shown) for carrying out the operations described herein, in accordance with one or more aspects of the present disclosure. Instructions 625 may also reside, completely or at least partially, within main memory 604 and/or within processing device 602 during execution thereof by computing device 600, main memory 604 and processing device 602 also constituting computer-readable media. The instructions 625 may further be transmitted or received over a network 620 via network interface device 608.

While computer-readable storage medium 628 is shown in an illustrative example to be a single medium, the term "computer-readable storage medium" should be taken to include a single medium or multiple media, e.g., a centralized or distributed database and/or associated caches and servers, that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "switching," "starting," "deriving," "replicating," "stopping," or the like, refer to actions and processes performed or implemented by computing devices that manipulate and transform data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general-purpose computing device selectively programmed by a computer program stored in the computing device. Such a computer program may be stored in a computer-readable non-transitory storage medium.

The methods and illustrative examples described herein are not inherently related to any particular computer or other apparatus. Various general-purpose systems may be used in accordance with the teachings described herein, or it may prove convenient to construct more specialized apparatus to perform the required method steps. The required structure for a variety of these systems will appear as set forth in the description above.

The above description is intended to be illustrative and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times, or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure, e.g., circuitry, that performs the task or tasks during operation. As such, the unit/circuit/component can be said to be configured to perform the task, or configurable to perform the task, even when the specified unit/circuit/component is not currently operational, e.g., is not on. The units/circuits/components used with the "configured to" or "configurable to" language include hardware, e.g., circuits and memory storing program instructions executable to implement the operation. Reciting that a unit/circuit/component is "configured to" perform one or more tasks, or is "configurable to" perform one or more tasks, is expressly intended not to invoke 35 U.S.C. § 112(f) for that unit/circuit/component. Additionally, "configured to" or "configurable to" can include generic structure, e.g., generic circuitry, that is manipulated by software and/or firmware, e.g., an FPGA or a general-purpose processor executing software, to operate in manner that is capable of performing the task(s) at issue. "Configured to" may also include adapting a manufacturing process, e.g., a semiconductor fabrication facility, to fabricate devices, e.g., integrated circuits, that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
  receiving a first electronics control unit (ECU) profile, the first ECU profile comprising a first set of services;
  switching execution, on an ECU, by a processing device, to the first ECU profile from a second ECU profile, the second ECU profile comprising a second set of services, wherein an intersection of the first set of services and the second set of services comprises a third set of services, wherein the switching is based on at least one of:
  environment data from a sensor; or an instruction from a client device;
    stopping, on the ECU, services included in the second ECU profile and not included in the third set of services;
    closing an open file of a stopped service; and
    after the stopping, starting, on the ECU, services included in the first set of services and not included in the third set of services.

2. The method of claim 1, further comprising deriving the third set of services to avoid replicating service state.

3. The method of claim 1, wherein the first ECU profile further comprises a set of artifacts, the set of artifacts associated with the first set of services.

4. The method of claim 1, wherein the ECU is a vehicle ECU, wherein switching execution is a result of a change in vehicle state, the change in vehicle state resulting from an operator action.

5. The method of claim 1, wherein restarting the services in the third set of services is avoided.

6. A system comprising:
  a memory; and
  a processing device, operatively coupled to the memory, to:
    receive a first electronics control unit (ECU) profile, the first ECU profile comprising a first set of services;
    switch execution on an ECU to the first ECU profile from a second ECU profile, the second ECU profile comprising a second set of services, wherein an intersection of the first set of services and the second set of services comprises a third set of services, wherein switching the execution is based on at least one of: environment data from a sensor; or an instruction from a client device;
    stop, on the ECU, services included in the second ECU profile and not included in the third set of services;
    close an open file of a stopped service; and
    after stopping the services included in the second ECU profile and not included in the third set of services, start, on the ECU, services included in the first set of services and not included in the third set of services.

7. The system of claim 6, wherein the processing device is further to derive the third set of services to avoid replicating service state.

8. The system of claim 6, wherein the first ECU profile further comprises a set of artifacts, the set of artifacts associated with the first set of services.

9. The system of claim 6, wherein the ECU is a vehicle ECU, wherein to switch execution to the first ECU profile from the second ECU profile is a result of a change in vehicle state, the change in vehicle state resulting from an operator action.

10. The system of claim 6, wherein to switch execution is further to avoid restarting the services in the third set of services.

11. A non-transitory computer-readable storage medium including instructions that, when executed by a processing device, cause the processing device to:
    receive, on the processing device, a first electronics control unit (ECU) profile, the first ECU profile comprising a first set of services;
    switch execution, on an ECU, to the first ECU profile from a second ECU profile, the second ECU profile comprising a second set of services, wherein an intersection of the first set of services and the second set of services comprises a third set of services, wherein the switching is based on at least one of: environment data from a sensor; or an instruction from a client device;
    stop, on the ECU, services included in the second ECU profile and not included in the third set of services;
    close an open file of a stopped service; and
    after stopping the services included in the second ECU profile and not included in the third set of services, start, on the ECU, services included in the first set of services and not included in the third set of services.

12. The non-transitory computer-readable storage medium of claim 11, wherein the instructions further cause the processing device to derive the third set of services to avoid replicating service state.

13. The non-transitory computer-readable storage medium of claim 11, wherein the first ECU profile further comprises a set of artifacts, the set of artifacts associated with the first set of services.

14. The non-transitory computer-readable storage medium of claim 11, wherein the ECU is a vehicle ECU, wherein the instructions further cause the processing device to switch execution as a result of a change in vehicle state, the change in vehicle state resulting from an operator action.

\* \* \* \* \*